May 17, 1966 D. C. TABLER 3,251,428
RECOVERY OF POLYOLEFINS FROM SOLUTION IN A FLUIDIZED DRYER
Filed Oct. 22, 1962
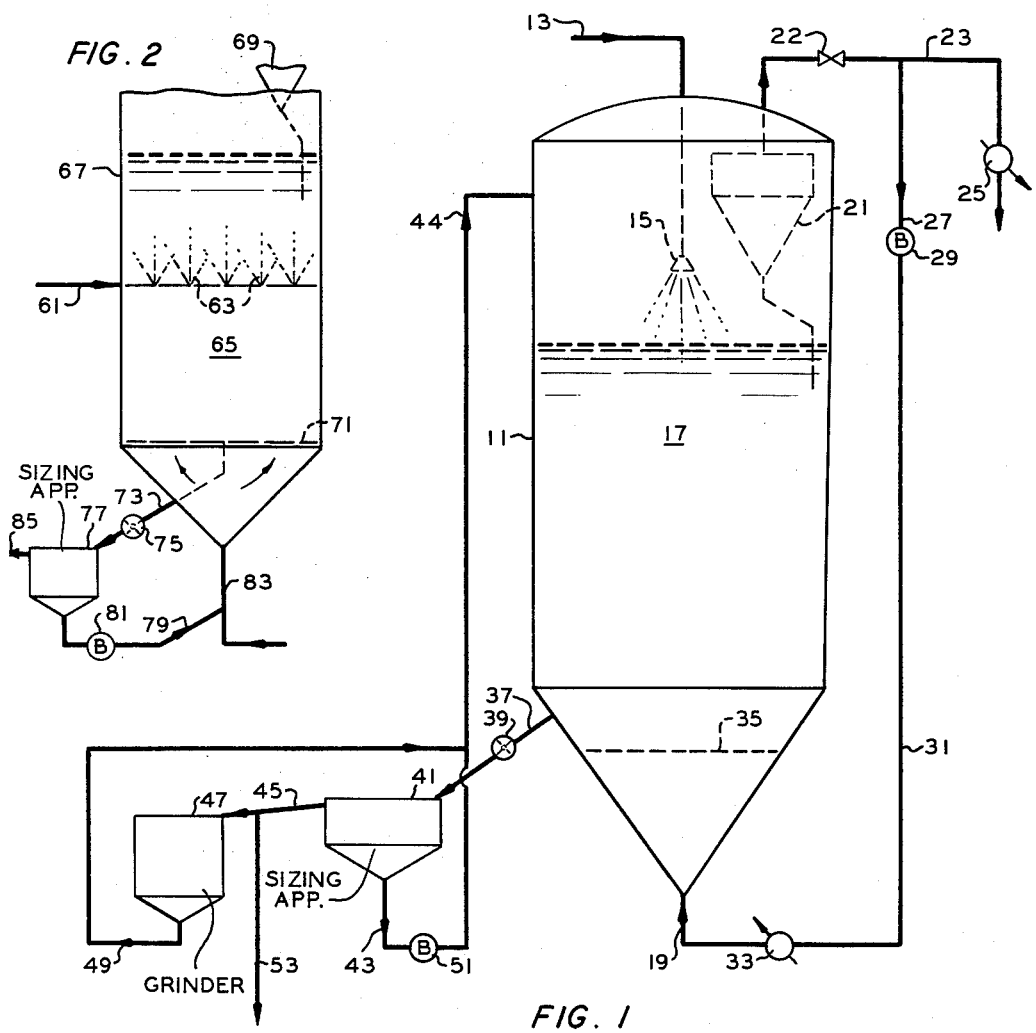
INVENTOR.
D.C. TABLER
BY Young & Quigg
ATTORNEYS

United States Patent Office 3,251,428
Patented May 17, 1966

3,251,428
RECOVERY OF POLYOLEFINS FROM SOLUTION IN A FLUIDIZED DRYER
Donald C. Tabler, Bartlesville, Okla., assignor to Phillips Petroleum Company, a corporation of Delaware
Filed Oct. 22, 1962, Ser. No. 231,996
5 Claims. (Cl. 117—100)

This invention relates to recovery of polyolefin from a solution of said polyolefin in a hydrocarbon. In one aspect it relates to recovery of a polyolefin from a solution or a slurry of said polyolefin in a hydrocarbon in the form of solid, compact particles. In another aspect it relates to apparatus and method for recovering polyethylene from a solution or a slurry of polyethylene in cyclohexane.

In a prior art method for recovery of polyolefin from its solution in a solvent or from a slurry wherein flash vaporizing of feed sprayed into a fluidized bed of polymer is employed for solvent removal, the polyolefin is recovered as fine strings or thread-like material. Such material is difficult to handle or to transfer from one place to another. This flash vaporizing process, however, provides for rapid vaporizing of solvent with the production of relatively solvent free polymer.

It is preferred, however, to produce solid particles of polymer because such particles of polyethylene, or other polyolefins, are free flowing and easy to handle.

An object of this invention is to provide a method and apparatus for recovery of polyolefin from a solution or slurry of said polyolefin in a hydrocarbon. Another object of this invention is to provide a method and apparatus for recovery of a polyolefin from a solution or slurry of polyolefin in a hydrocarbon in the form of solid, compact particles. Another object of this invention is to provide such a method and apparatus which is easy and simple to construct and to operate. Yet another object of this invention is to provide a method and apparatus for recovery of polyethylene from a solution of polyethylene in cyclohexane. Other objects and advantages of this invention will be realized upon reading the following description which, taken with the attached drawing, forms a part of this specification.

In the drawing, FIGURE 1 illustrates, in diagrammatic form, an arrangement of apparatus parts for carrying out the method of this invention. FIGURE 2 illustrates, in diagrammatic form, an alternate embodiment of a portion of the apparatus of FIGURE 1.

In FIGURE 1, reference numeral 11 identifies a cylindrical vessel positioned with its axis upright. A conduit 13 extends into the upper portion of the vessel and is provided on its inner end with a spray nozzle 15. A bed of solid particulate polymer material 17 is provided in the vessel and this material rests on a perforate plate 35. Since this material 17 is maintained in a fluidized condition, a cyclone separating apparatus 21 is provided in the upper portion of the vessel for separation of solid material entrained in vaporous material to be withdrawn from the top of the vessel. A conduit 23 leads from the vaporous outlet of separator 21 to a condenser 25 for condensation of solvent vapors. A conduit 27, as a bypass conduit, leads from conduit 23 to a blower 29 which in turn communicates with a conduit 31 leading to a heater 33. The outlet of heater 33 communicates by way of the conduit 19 with the portion of vessel 11 below the perforate plate 35. A valve 22 is positioned in conduit 23 for pressure maintenance in vessel 11 or, if desired, this valve can be positioned downstream of condenser 25.

A conduit 37, provided with a star valve 39, communicates with vessel 11 above but near perforate plate 35 for passage of solid material to a subsequent process step. A screening or sizing apparatus 41 communicates with the discharge end of conduit 37 and this sizing apparatus is provided with a screen of suitable size for separating material of product size from material smaller than product size. A conduit 43 communicates the portion of sizing apparatus in which the undersize collects with a blower 51 which in turn is communicated with the upper portion of vessel 11 by a conduit 44. A conduit 45 communicates the portion of the sizing apparatus in which the oversize material accumulates with a grinder 47. Throughput from grinder 47 is passed through a conduit 49 either directly into the upper portion of vessel 11 or conduit 49 can communicate with conduit 44 as illustrated in FIGURE 1. A conduit 53 communicates with conduit 45 for withdrawal of a portion of the oversize material passing through conduit 45 as product of the operation.

While in FIGURE 1 spray nozzle 15 is arranged to spray the feed material onto the top of the fluidized bed 17 and into the bed somewhat from the upper surface, such positioning of spray nozzle 15 is not critical. In FIGURE 2 is illustrated an alternate embodiment of the positioning of one or more sprays 63 for introduction by spraying of a feed material from conduit 61 into the body of a fluidized bed 65. Bed 65 and sprays 63 are within vessel 67, this vessel being more or less similar to vessel 11 of FIGURE 1. Reference numeral 69 identifies a portion of a separating means which may be similar to the cyclone separator 21 illustrated in FIGURE 1. Conduit 73 receives particulate material from the center of a perforate plate 71 positioned in the lower portion of vessel 67. This conduit is also provided with a star valve 75 for control of the withdrawal of particulate material and its passage to a sizing apparatus 77, such as a shaker or vibrating screen. A conduit 79, provided with a blower 81, passes undersize material from sizing apparatus to a conduit 83 which corresponds to conduit 19 of FIGURE 1. A conduit 85 is for withdrawal of oversize material from sizing apparatus 77.

The sizing equipment, 41 and 77, are preferably screens, for example vibrating screens, and in this case of approximately 0.01 inch opening. This size of the openings is such that undersize material smaller than 0.01 inch in diameter will pass through the screen or return to the fluidized bed for further growth. In this particular case particulate material greater than 0.01 inch in diameter is considered suitable for product.

In the operation of the apparatus of FIGURE 1, a slurry, for example, or a solution of polyethylene in cyclohexane is sprayed through spray nozzle 15 into a fluidized bed of polyethylene particles of suitably small size maintained in a fluidized condition by passing upwardly therethrough a hot stream of vaporous cyclohexane. The hot stream of vaporous cyclohexane introduced by way of conduit 19 flows upwardly through perforate plate 35 and maintains the bed 17 in a fluidized condition and this upwardly flowing hot vaporous stream vaporizes the solvent cyclohexane from the sprayed material. The solvent is thus evaporated from the surfaces of the particulate material of the fluidized bed. The particles which receive a coating of the spray material increase in size by the amount of polyethylene remaining after vaporization of the solvent. The upflowing vaporous cyclohexane and the vaporized cyclohexane from the feed material enter the cyclohexane separator 21 in which any entrained particulate material is separated. The material-free vaporous cyclohexane is removed from separator 21 in conduit 23 and a portion of this cyclohexane is passed on to a condenser 25 for recovery. A portion of the vaporous cyclohexane required for maintaining the bed 17 in a fluidized condition is bypassed from conduit 23 through conduit 27 under the influence of a blower 29. This bypassed cyclohexane vapor is heated in heater 33 to such a temperature as to promote vaporization of the solvent cyclohexane introduced through spray nozzle 15.

As an example of the operation of this invention, a vessel having a diameter of 1 foot is provided with polyethylene particulate material of a diameter smaller than 0.01 inch. The depth of this bed of particulate material is 4 feet. The bypass or recycle vaporous cyclohexane is heated in heater 33 to a temperature of about 400° F. A pressure of 28.5 p.s.i.a. (pounds per square inch absolute) is maintained in vessel 11. The void space in the fluidized bed is about 80 percent and the vapor linear upward velocity of the heated vaporous cyclohexane is approximately 0.90 foot per second. Such velocity maintains this bed in a properly fluidized condition so that a temperature of about 220° F. is maintained substantially throughout the entire bed. The solution of polyethylene in cyclohexane is sprayed into vessel 11 at a temperature of approximately 220° F. Vaporous cyclohexane leaves the top of the cyclone separator at a temperature of approximately 230° F. In this particular case 167 pounds per hour of polymer solution containing 6 weight percent of polyethylene in cyclohexane was sprayed into the vessel for recovery of the polyethylene. 503 pounds per hour of vaporous cyclohexane is removed from the top of the cyclone separator and 346 pounds of this removed cyclohexane is bypassed and heated to the above-mentioned temperature of about 400° F. for maintaining the bed in the fluidized condition. The portion of the vaporous cyclohexane passing through conduit 23 not required for fluidizing purposes is condensed in a condenser corresponding to condenser 25. In this instance 157 pounds per hour of cyclohexane was recovered as liquid. The 167 pounds per hour of polymer feed material contains 10 pounds of polymer. Approximately 33½ pounds per hour of solid polymer is withdrawn through a conduit corresponding to conduit 37 and is treated in the sizing apparatus corresponding to apparatus 41. Undersize material is passed through conduits 43 and 44 for return to the drying vessel 11. Oversize material passes through conduit 45 to grinder 47 with a portion thereof equal to about 10 pounds per hour which was withdrawn through a conduit corresponding to conduit 53 as product. The discharge of grinder 47 passes through a conduit 49 and is combined with the undersize material passing through conduit 44.

The pressure maintained in conduit 13 upstream of spray nozzle 15 is merely sufficient to provide proper spraying of the feed material through the spray nozzle. The temperature in the bed 17 is approximately 220° F. and this temperature is about the same as the temperature of the sprayed material so that there will not be flash vaporizing of the solvent with the production of stringy or fibrous polyethylene. According to this invention, only or substantially only solid particulate polyethylene material is produced.

Grinder 47 can be such a piece of equipment as the Model 0 granulating machine manufactured by Cumberland Engineering Company, Newport, Rhode Island, and described in their Bulletin No. 260.

In the operation of the embodiment of evaporator illustrated in FIGURE 2, the polyolefin solution is introduced by way of a conduit 61 and is sprayed upwardly within the fluidized bed 65. The same temperature and pressure conditions are maintained in vessel 67 as were disclosed in the operation of the apparatus of FIGURE 1. Suitable polymer particles are also produced in accordance with the apparatus of FIGURE 2.

While certain embodiments of the invention have been described for illustrative purposes, the invention obviously is not limited thereto.

That which is claimed is:

1. A process for recovering particulate, non-fibrous polyethylene from a hydrocarbon solution of polyethylene in cyclohexane comprising the steps of:

(1) maintaining a fluidized bed of particles of polyethylene horizontally continuous from the central axis to the periphery thereof in a lower section of an enclosed drying zone by passing upwardly through the entire bed a vaporous stream of said cyclohexane at a temperature of about 400° F. as the fluidizing gas, said gas passing substantially upwardly directly into a free gas space adjoining said bed;

(2) spraying directly into said fluidized bed droplets of said solution free of solids at a temperature of about 220° F. so as to coat said particles with said solution and vaporize cyclohexane therefrom, leaving a residual coating of solid polyethylene on said particles;

(3) maintaining the pressure in said zone at about 28.5 p.s.i.a. so as to substantially avoid flashing of solvent;

(4) withdrawing a vapor stream of cyclohexane substantially free of solids from said zone above said bed;

(5) withdrawing particles of coated polyethylene from said bed as a product; and (6) introducing solid particles of said polyethylene to said bed as nuclei.

2. The process of claim 1 wherein the particles of polyethylene in step (6) are larger than about 0.01 inch diameter.

3. In the process of claim 1 wherein the nuclei are provided by separating oversize particles from the product of step (5), grinding a portion of said oversize particles for production of particles less than 0.01 inch diameter, returning the ground portion to said zone, and withdrawing the remaining portion of oversize particles as product.

4. A method for recovering polyolefin in non-fibrous form from a solution thereof in hydrocarbon of relatively low boiling point comprising the steps of:

(1) maintaining a fluidized bed of particles of said polyolefin laterally continuous from the central axis to the periphery thereof in an enclosed drying zone by passing upwardly thru all sections of said bed a vapor stream of said hydrocarbon substantially above the boiling point of said hydrocarbon at ambient pressure;

(2) spraying directly into said bed onto the particles therein said solution of polyolefin at a temperature below the flash temperature of said hydrocarbon;

(3) maintaining pressure and temperature in said bed so as to effect vaporization of substantially all of the solvent from the solution sprayed on said particles in step (2) and deposit polyolefin thereon;

(4) withdrawing solvent vapor from the drying zone of step (1) at a level above said bed; and (5) withdrawing solid polyolefin particles in non-fibrous form containing polyolefin deposited in step (3) directly from a lower section of said bed.

5. A method for recovering a polyolefin in non-fibrous form from a hydrocarbon solution of said polyolefin comprising:

(1) maintaining an upright cylindrical fluidized bed of finely divided particles of said polyolefin in an enclosed zone by passing upwardly therethrough a vaporous stream of said hydrocarbon, said particles remaining in said bed while the fluidized gas passes upwardly therethru;

(2) spraying directly onto the particles in said bed said solution free of solids at a temperature above the normal boiling point of said hydrocarbon at a pressure sufficient to maintain most of the sprayed liquid in the liquid phase until deposited on said particles, the vaporous stream of hydrocarbon being introduced into said bed at a temperature higher than the temperature of the sprayed solution thereby evaporating substantially all of the solvent from the sprayed liquid on said particles in the absence of flash vaporization and thereby producing a layer of deposited polyolefin on said particles;
(3) withdrawing hydrocarbon vapors from said bed directly and upwardly into a free gas space;
(4) dividing the withdrawn vapors into two portions;
(5) heating one portion of the withdrawn vapor and returning the heated portion to said zone as the vaporous stream of hydrocarbon introduced thereinto;
(6) withdrawing a stream of said particles in non-fibrous form having deposited polyolefin thereon directly from a lower section of said zone;
(7) passing the withdrawn particles into a particle sizing zone and separating the same into oversize and undersize particles;
(8) returning the undersize particles to said zone; and
(9) withdrawing the oversize particles as the product of the operation.

References Cited by the Examiner

UNITED STATES PATENTS

| | | | |
|---|---|---|---|
| 1,157,935 | 10/1915 | Gray | 99—199 |
| 1,461,640 | 7/1923 | Wirth-Frey | 159—16 |
| 2,337,684 | 12/1943 | Schieneman | 23—308 |
| 2,347,682 | 5/1944 | Gunness | 260—449.6 |
| 2,561,393 | 7/1951 | Marshall | 159—4 X |
| 2,561,394 | 7/1951 | Marshall | 117—100 |
| 2,561,395 | 7/1951 | Marshall | 159—4 X |
| 2,635,684 | 4/1953 | Joscelyne | 159—48 |
| 2,949,447 | 8/1960 | Hawkins et al. | 260—93.7 |
| 2,957,855 | 10/1960 | McLeod | 260—88.2 |
| 3,084,107 | 4/1963 | McMahon | 159—16 X |

NORMAN YUDKOFF, *Primary Examiner.*